No. 832,900. PATENTED OCT. 9, 1906.
W. GOODSPEED.
SLIDE VALVE AND ADJUSTABLE CUT-OFF.
APPLICATION FILED MAR. 29, 1906.

2 SHEETS—SHEET 1.

Witnesses: Inventor: William Goodspeed,
By Thomas G. Orwig,
Attorney.

No. 832,900. PATENTED OCT. 9, 1906.
W. GOODSPEED.
SLIDE VALVE AND ADJUSTABLE CUT-OFF.
APPLICATION FILED MAR. 29, 1906.

2 SHEETS—SHEET 2.

UNITED STATES PATENT OFFICE.

WILLIAM GOODSPEED, OF PLANO, IOWA.

SLIDE-VALVE AND ADJUSTABLE CUT-OFF.

No. 832,900.     Specification of Letters Patent.     Patented Oct. 9, 1906.

Application filed March 29, 1906. Serial No. 308,814.

*To all whom it may concern:*

Be it known that I, WILLIAM GOODSPEED, a citizen of the United States, residing at Plano, in the county of Appanoose and State of Iowa, have invented a new and useful Slide-Valve and Adjustable Cut-Off, of which the following is a specification.

My object is, first, to prevent the waste of power at each stroke of the piston by confining live steam in long ports that extend from the center portion of the cylinder to the ends of the cylinder; second, to retain the steam in each end of the cylinder until the piston reaches the end of the cylinder as required to utilize the expansive force of the steam in the cylinder during each stroke of the piston in the cylinder; third, to open the induction-port at one end of the cylinder and the exhaust-port at the other end of the cylinder simultaneously, so that the live steam when admitted into the one end of the cylinder will not be resisted by exhausting steam in the other end of the cylinder; fourth, to restrict the reciprocating sliding motion of the valve by making two ports for live steam in each end of the valve to communicate with the cylinder ends and concaves in the under sides of the ends of the valve to communicate with the exhaust-ports, thereby causing the live steam and the exhaust-steam to flow instantly at each stroke of the piston; fifth, to provide a slidable frame and port-cover on top of the slide-valve, by means of which the live steam may be cut off in varying degrees of power without affecting the operation of the exhaust-ports and by such automatic cut-off adapt the engine for operating extraneous machinery at different times with varying power; sixth, to regulate the speed and power of the engine by an automatic cut-off; seventh, to provide means for adjusting the sliding frame and cut-off relative to the ports in the ends of the slide-valve My invention consists in the construction, arrangement, and combination of elements and subcombinations, as hereinafter set forth, pointed out in my claims, and illustrated in the accompanying drawings, in which—

Figure 1:
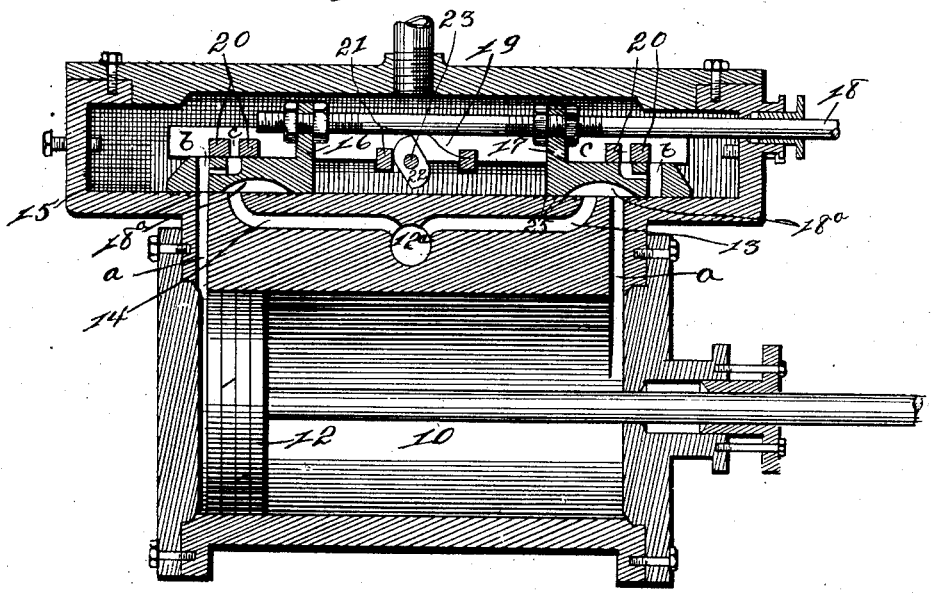
Figure 2:
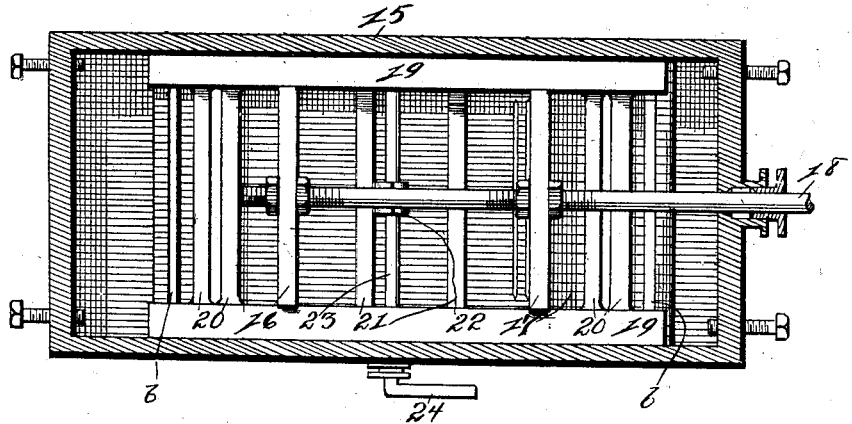
Figure 3:
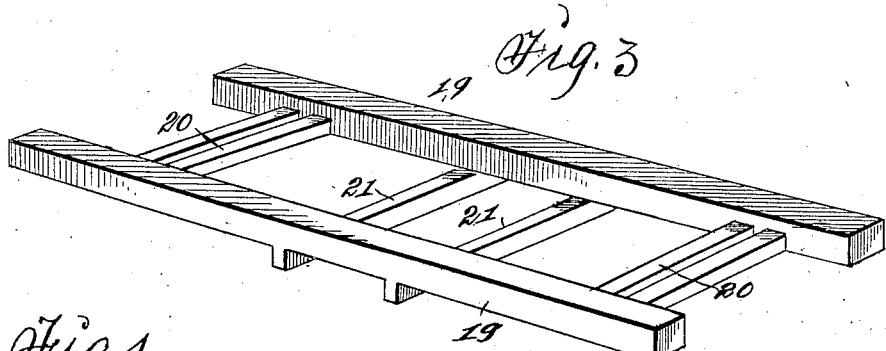
Figure 4:
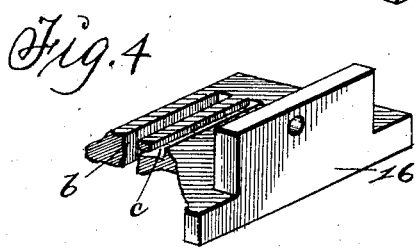
Figure 5:
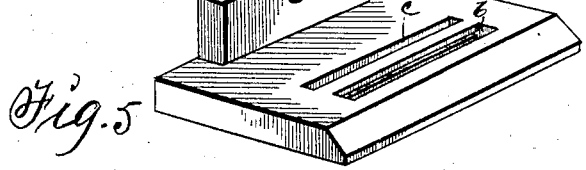
Figure 6:
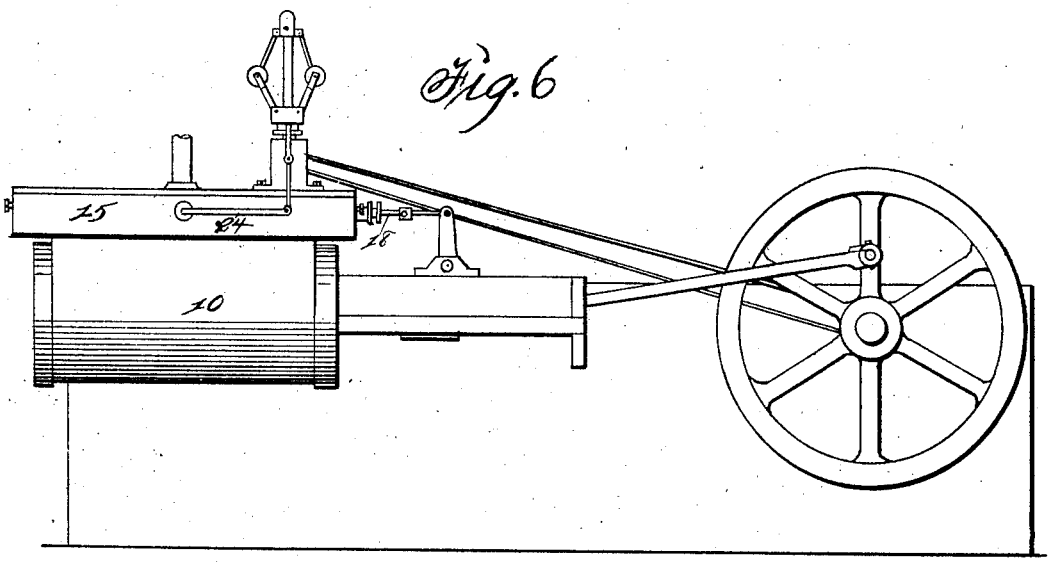

Figure 1 is a vertical longitudinal sectional view of the cylinder and steam-chest and shows the forms and relative positions of the ports, the slide-valve, and the adjustable cut-off on top of the valve. Fig. 2 is a top view that shows the cover of the steam-chest removed and discloses the cut-off and valve. Fig. 3 is an enlarged perspective view of the slidable frame and the cut-off valve. Figs. 4 and 5 show the two separate members of the cut-off valve detached from the valve-stem. Fig. 6 is a side elevation of the engine and shows how the valve-adjusting device is connected with the governor.

The numeral 10 designates a cylinder, and 12 a piston. Ports $a$ for live steam at the ends of the cylinder extend straight up through the top of the cylinder and alternately convey live steam into the cylinder and exhaust-steam from the cylinder. An exhaust-port $12^a$ extends laterally from the center of the cylinder, and branches 13 and 14 extend horizontally in reverse ways and through top of the cylinder near the ports $a$ and $b$, as shown in Fig. 1. A steam-chest 15 is fitted and fixed upon the top of the cylinder to extend over the ends of the cylinder, as required, for the valve, composed of two members, that coact with the ports $a$ and $b$ at the ends of the cylinder.

The slide-valve is composed of two mating members 16 and 17 and connected with a valve-stem 18, as shown in Fig. 1. Each member has a straight port $b$ at its outer end to communicate with the port $a$ in the cylinder and an auxiliary elbow-shaped port $c$ to communicate with the port $b$, as shown in Fig. 1. Each member 16 and 17 of the slide-valve has an elongated cavity $18^a$ in its under side to communicate with the exhaust-ports 12, 13, and 14.

An auxiliary cut-off valve is composed of two parallel side bars 19, two parallel cross-bars 20 at each end portion of the side bars, and two parallel bars 21 at the central part of side bars, as clearly shown in Fig. 3. This auxiliary cut-off is placed on the tops of the slide-valve members 16 and 17, so the cross-bars 20 can be adjusted relative to the ports $b$ and $c$ as required for regulating the passage of live steam from the steam-chest 15 down through the ports $a$ and into the ends of the cylinder 10, and to thereby control the speed and power of the engine.

An adjustable turn-button 22 on a shaft 23, journaled in the sides of the steam-chest 15, engages the cross-bars 21 alternately, as required, for regulating the sliding motions of the members 16 and 17 of the slide-valve. The shaft 23 has an arm 24, connected with a governor 24 on top of the engine, as shown in Fig. 6. The degree of angle of the turn-button 22 relative to a perpendicular line regulates the length of motion of the auxiliary cut-off valve, composed of the bars 19 and 20. It is obvious that when the turn-button is adjusted as required to restrict the length of the stroke of the valve members the ports *b* and *c* will remain partially closed, and the quantity of live steam that passes through from the steam-chest into the cylinder will be accordingly reduced as required to regulate the speed and power of the engine.

A plurality of grooves 25 are formed in the top surface of the valve-seats upon which the valve members 16 and 17 move as required to be filled with oil, steam, and water to reduce friction and to practically thereby balance the valves.

Having thus set forth the purpose of my invention and the construction, arrangement, and combination of all the parts, the practical operation and utility thereof will be readily understood by persons familiar with the art to which it pertains.

What I claim as new, and desire to secure by Letters Patent, is—

1. In a steam-engine, a cylinder having inlet-ports at its ends, an exhaust-port at its center and branch ports extending therefrom to near the inlet-ports, a steam-chest, a slide-valve composed of two mating members connected with a valve-stem, ports in the outer end portions of the mating members communicating with the inlet-ports in the ends of the mating members, auxiliary ports in the mating members communicating with the ports in the outer ends of the mating members, an auxiliary slide-valve composed of two parallel bars, connected at their end portions by two parallel cross-bars and also connected at their central portions by two parallel cross-bars and means to adjust the auxiliary slide-valve longitudinally, arranged and combined to operate as set forth.

2. In a steam-engine, a steam-chest on top of a cylinder, a cylinder having inlet-ports at its ends and exhaust-ports between the inlet-ports, a slide-valve, an auxiliary slide-valve on top of the main slide-valve, cross-bars at the central part of the auxiliary slide-valve, a shaft journaled in the sides of the steam-chest, a turn-button on the shaft, an arm on the end of the shaft and a governor connected with said arm, arranged and combined to operate as set forth.

WILLIAM GOODSPEED.

Witnesses:
J. A. MORRISON,
J. M. SCIFERS.